J. E. ROBINSON.
Ice-Cream Freezer.
No. 61,360.
Patented Jan. 22, 1867.
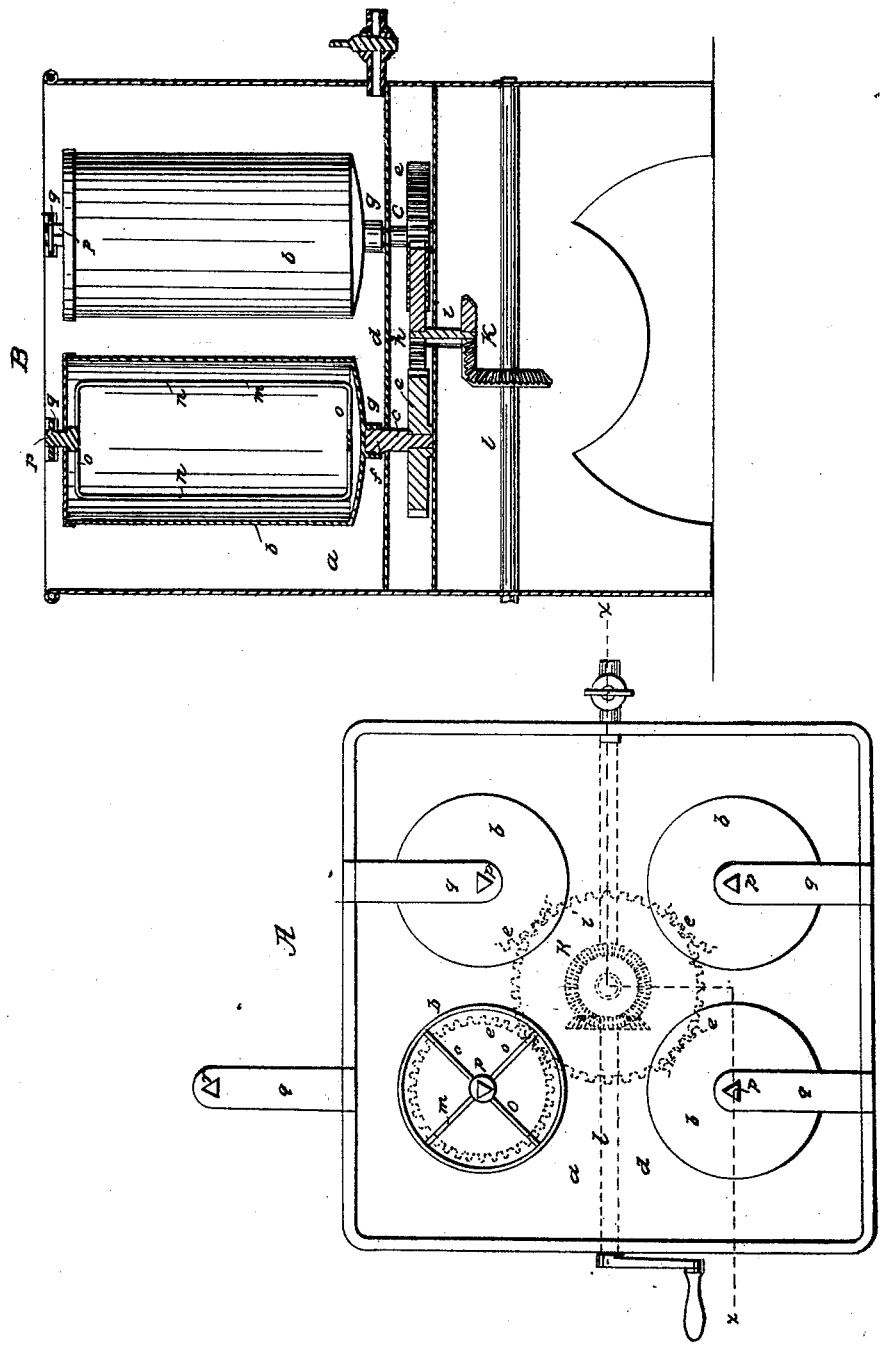
Witnesses:
Inventor:

United States Patent Office.

JOHN E. ROBINSON, OF BOSTON, MASSACHUSETTS.

Letters Patent No. 61,360, dated January 22, 1867.

IMPROVED ICE-CREAM FREEZER.

*The Schedule referred to in these Letters Patent and making part of the same.*

TO ALL WHOM IT MAY CONCERN:

Be it known that I, JOHN E. ROBINSON, of Boston, in the county of Suffolk, and State of Massachusetts, have invented an Improved Ice-Cream Freezing Apparatus; and I do hereby declare that the following, taken in connection with the drawings which accompany and form part of this specification, is a description of my invention sufficient to enable those skilled in the art to practise it.

The invention relates to an arrangement and method of operating rotary ice-cream freezers, and consists primarily in the disposition of a gang or series of cream cylinders, in a common ice or brine vessel, the cylinders being so arranged as to be simultaneously rotated by a single crank. The invention also consists in combining with each of a series of rotary cream cylidders, so arranged, a stationary scraper, and in the method of connecting each cylinder with its driving-shaft. The drawing represents a freezing apparatus embodying my invention—

A, showing a plan of the same.

B, a vertical section on the line $x\ x$.

$a$ denotes the vessel for containing the ice or freezing mixture; $b\ b\ b\ b$, a series of cylinders for containing the cream to be frozen. Each of these cylinders is mounted on a short shaft, $c$, projecting up through the bottom plate $d$ of the vessel $a$, and rotating in such plate, the shaft having a gear, $e$, at its lower end, as seen at B. Each shaft, $c$, has a screw, $f$, at its upper end, which enters a screw-thread formed in the spindle $g$ of the cylinder, (as seen at B,) thus enabling any one or more of the cylinders to be detached from its rotating shaft $a$. The gears $e$ mesh into and are driven by a central gear, $h$, on the top of a vertical shaft, $i$, at the bottom of which is a bevel gear, $k$, driven by a similar gear on a crank-shaft, $l$, turning in bearings in the side walls of the vessel $a$. Each cylinder, $b$, has within it a scraper, $m$, made up of vertical wires or plates, $n$, united by cross-wires or arms, $o$, the wires $n$ lying loosely against the sides of the cylinder, and scraping the adhering and freezing cream therefrom, and serving, in connection with the rotary motion of the cylinder, to keep up a circulation of the freezing and fluid particles of the cream until it is all homogeneously frozen. From the top of each scraper frame rises a central spindle, $p$, projecting through the cover of the cylinder, and having at its upper end a square or prismatic form, as seen at A. Adjacent to each cylinder a locking plate, $q$, is hinged to the edge of the vessel $a$, this plate having an aperture, $r$, of form similar to top of spindle $p$.

When the freezer is to be operated all the locking plates are turned down against or so as to receive the tops of the spindles, and serve to keep the scrapers stationary while the cylinders rotate, and also serve as bearings to maintain the cylinders in proper vertical position during their rotation. By this arrangement of the cylinders for simultaneous operation in the same freezing vessel, it will be obvious that the same amount of cream may be much more expeditiously, evenly, and conveniently frozen than where a large cylinder is employed to hold all the cream; and where the same or differently flavored creams are to be frozen, either cylinder may be disconnected from its driving-shaft when desirable, and being moved one side thereof, may be kept in the same freezing vessel, and the frozen cream removed at pleasure, or may be removed from the vessel and replaced on its shaft by another cylinder with fresh cream. The driving mechanism may be placed over the top of the vessel, but for convenience of access to the cylinders, I prefer the arrangement shown.

I claim, in combination with a freezing vessel, $a$, the arrangement of a series of cream cylinders, $b$, to be simultaneously rotated within the same, when each cylinder is so mounted as to be capable of disconnection from the driving mechanism and removal from the freezing vessel, without disturbing the other cream cylinders, substantially as set forth.

I also claim, in combination with such an arrangement and method of operation of the cylinders, the stationary scrapers, held in place during the rotation of the cylinders, substantially as described.

Also, mounting each cylinder on a screw-shaft, and so as to be removable therefrom, substantially as and for the purpose described.

J. E. ROBINSON.

Witnesses:
F. GOULD,
S. B. KIDDER.